Sept. 21, 1926.
D. C. DAVIS
EMERGENCY STOP DEVICE
Filed May 1, 1925
1,600,322
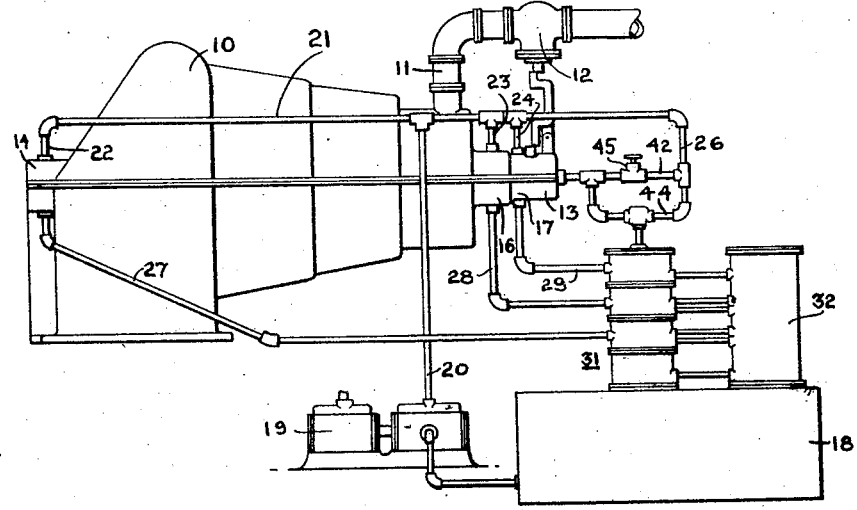
Fig. 1.
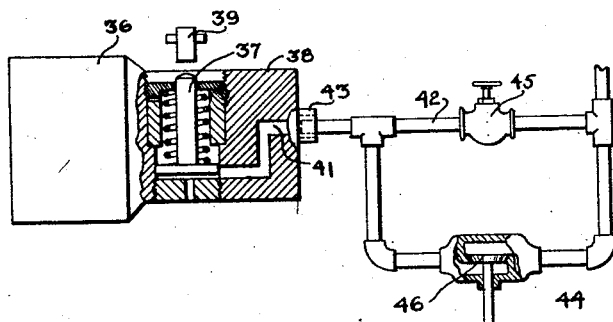
Fig. 2.
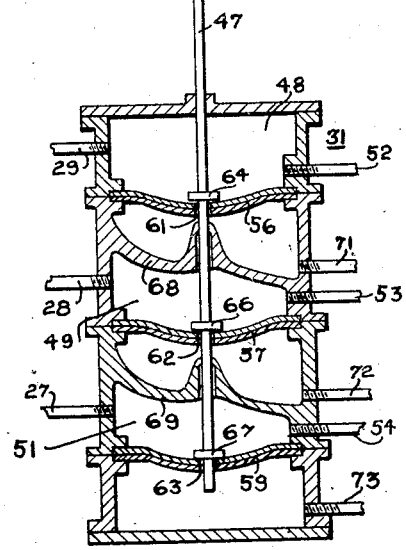
INVENTOR Patented Sept. 21, 1926.

1,600,322

UNITED STATES PATENT OFFICE.

DAVID C. DAVIS, OF CHESTER, PENNSYLVANIA, ASSIGNOR TO WESTINGHOUSE ELECTRIC & MANUFACTURING COMPANY, A CORPORATION OF PENNSYLVANIA.

EMERGENCY STOP DEVICE.

Application filed May 1, 1925. Serial No. 27,332.

My invention relates to emergency stop devices for rotating machinery and has for its object the provision of apparatus of the character designated which shall be effective to stop the machine to which it is applied responsive to temperature changes at selected points about the machine.

More specifically the object of my invention is to provide an emergency stop device for an elastic fluid turbine which shall be effective to stop the turbine responsive to temperature changes in the turbine bearings.

Apparatus embodying features of my invention is illustrated in the accompanying drawings forming a part of this specification in which Fig. 1 is a view in elevation showing an elastic fluid turbine having my improved emergency stop device applied thereto, and Fig. 2 is a sectional view of the emergency stop device associated with a well-known form of auto stop governor.

In the operation of power plants, marine installations and the like, the safety of the entire plant or installation depends to a great extent upon the condition of the bearings. If a single bearing should become overheated, without the knowledge of the attendant in time to correct the trouble, a power unit might be wrecked, entailing its withdrawal from power producing service when most needed and also entailing more or less extensive repairs before it could again be placed in service. Various schemes have been proposed for warning an attendant of the overheating of bearings or danger thereto, such, for example, as means for ringing a bell or giving other warning in response to failure of oil pressure in the lubricating system, the provision of temperature registry and recording means associated with each bearing and the like. In all such proposals with which I am familiar, however, the advantages to be obtained are dependent on the watchfulness of the attendant.

I have accordingly devised a means for automatically shutting down a machine, for example, an elastic fluid turbine, upon the attainment of predetermined temperature of a turbine bearing. The invention is carried out in connection with a circulating lubricating system by means of a device movable in response to a predetermined change in temperature and placed in the path of the lubricating fluid after it passes over the bearing. The device responsive to temperature may be conveniently associated with a well-known form of auto stop governor for a turbine which embodies controllable means for effecting the closing of the turbine throttle at a speed below the speed at which the auto stop governor is set.

Referring now to the drawings for a better understanding of my invention, I show in Fig. 1 at 10 an elastic fluid turbine having a motive fluid inlet 11 and a throttle valve 12. The throttle valve 12 is adapted to be closed in a manner well understood in the art upon the attainment of a predetermined overspeed, by an auto stop governor 13. The turbine is provided with bearings 14 and 16 and may also be provided with a thrust bearing 17. At 18 I show an oil reservoir from which lubricant is supplied to the bearings by a pump 19 which delivers oil under pressure through a conduit 20 and a suitable oil main 21. Leading from the main 21 are branch conduits 22, 23 and 24 leading to the bearings 14, 16 and 17 respectively. At 26 I show a branch conduit from the main 21 which is adapted to convey fluid under pressure to the auto stop governor 13. After fluid has passed through the bearings 14, 16 and 17 it drains therefrom through conduits 27, 28 and 29 respectively, to my improved emergency stop device 31. The emergency stop device 31 is arranged to permit a continuous flow of lubricant therethrough from whence it passes through an oil cooler 32 and from thence back to the reservoir 18.

Referring now to Fig. 2, I show at 36 the turbine shaft which is provided with an auto stop governor such as is described in the patent to J. F. Johnson, No. 1,441,353, assigned to the Westinghouse Electric and Manufacturing Company. The auto stop governor embodies an eccentrically weighted piston member 37 mounted in a diametral recess in the shaft. The piston member 37 is normally retained inwardly of the shaft by a spring 38 and is adapted to move outwardly thereof due to centrifugal force upon the attainment of a predetermined overspeed, whereupon it strikes a tripping member 39 and effects a closing of the throttle valve 12. The shaft 36 is provided with a passage 41 leading to the underside of the piston member 37 and connected to the branch conduit 26 by means of a conduit 42 and a bayonet joint 43.

A normally closed valve 45 is provided in the conduit 42 which may be opened to admit oil under pressure to the space beneath the piston member 37 whenever it is desired to test the auto stop governor at a speed below the overspeed at which it is set.

At 44 I show a by-pass conduit leading from the branch conduit 26 around the valve 45 to the conduit 42. The passage of oil under pressure through the conduit 44 is controlled by a valve 46, which is also normally closed. The valve 46 is actuated by a stem 47 connected to my emergency stop device which will now be described.

The emergency stop device 31 comprises a cylindrical housing embodying, for example, three chambers 48, 49 and 51 into which the conduits 27, 28 and 29 convey oil away from the bearings 14, 16 and 17, respectively. Oil admitted to the chambers 48, 49 and 51 drains away therefrom through conduits 52, 53 and 54 to the oil cooler 32 so that there is a continual circulation of oil through the chambers at substantially the same temperature at which it leaves the bearings. Located within each of the chambers 48, 49 and 51 is a bi-metallic member shown at 56, 57 and 59. The bi-metallic members 56, 57 and 59 are retained in suitable recesses provided in the walls of the chambers and are flexed downwardly as shown in the drawing so that there is at all times a strain upon said members due to said flexing. The bi-metallic members are composed of two metals having different coefficients of expansion within the range of desired temperature for the bearing such, for example, as brass and nickel steel. Inasmuch as the bi-metallic members 56, 57 and 59 are under a strain due to their flexure, when the oil passing over either of them attains a temperature determined by the different coefficients of expansion of the metals, it suddenly flexes in the opposite direction.

The stem 47 of the valve 46 passes through holes 61, 62 and 63 formed in the bi-metallic members 56, 57 and 59 and is provided with collars 64, 66 and 67 bearing upon the respective bi-metallic members. Upon flexure of either of said members from the position shown in the drawing the stem 47 is moved upwardly, opening the valve 46 and admitting oil under pressure beneath the piston member 37, effecting a shutting down of the turbine in a manner already described. In order to prevent oil passing from the bearings 14, 16 and 17 which might leak by the collars 64, 66 and 67 from affecting the operation of the device, I provide web members 68 and 69 beneath the collars 64 and 66 and provide drains 71, 72 and 73 leading to the oil cooler 32 for conveying said leakage away.

The operation of the device will be apparent. Under normal conditions with the valve 46 closed as shown in the drawing and the bearings 14, 16 and 17 running cool, no action takes place. Should either of the bearings, however, begin to overheat, oil passing therethrough is raised in temperature and the heated oil is conveyed through either the conduit 27, 28 or 29 to its associated bi-metallic member. When the temperature of the oil in either the chamber 48, 49 or 51 is raised to a degree determined by the characteristics of the bi-metallic member therein, the bi-metallic member suddenly flexes to a position opposite to that shown in the drawing, opens the valve 46 and effects a shutting down of the turbine in a manner already described. This shutting down of the turbine is effected before any danger of burning out the bearings occurs and the trouble can be located and corrected without damage to the unit. As soon as the flexed bi-metallic member has cooled sufficiently, it automatically springs back to its original position and the device therefore requires no resetting.

From the foregoing, it will be apparent that I have invented an improved emergency stop device effective to stop a machine with which it is associated in response to a predetermined temperature of a bearing.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. The combination with a machine having a bearing provided with forced lubrication, of temperature-responsive means subject to the temperature of the lubricant after leaving said bearing and operative to stop said machine when said temperature exceeds a predetermined amount.

2. In combination, a rotative shaft, a bearing for the shaft, means for circulating lubricating fluid through the bearing, means movable in response to a predetermined change in temperature interposed in the path of the lubricating fluid after passing through the bearing, and means actuated by the temperature-responsive means for stopping the shaft.

3. In an emergency stop device for a machine having bearings, the combination of a circulating lubricating system for the bearings, means movable in response to predetermined temperature changes interposed in the path of the lubricant after passing over each of the bearings, and means actuated by movement of the temperature-responsive means for shutting down the machine.

4. The combination with an auto stop governor embodying an eccentrically weighted tripping element carried by a rotative shaft and adapted to be operated by fluid pressure at a speed below that for which it is set, of a fluid pressure conduit leading to the tripping element, a valve in the conduit, and means movable in response to a predetermined temperature at a selected point for operating the valve.

5. The combination with an auto stop governor embodying an eccentrically weighted tripping element carried by a rotative shaft and adapted to be operated by fluid pressure at a speed below that for which it is set, of a fluid pressure conduit leading to the tripping element, normally closed valve in the conduit, and means movable in response to a predetermined temperature at a selected point for opening the valve.

6. The combination with an elastic fluid turbine having a shaft and associated therewith an auto stop governor embodying a piston member carried by the shaft and adapted to be actuated upon a definite overspeed thereof, of a conduit for conveying fluid under pressure to the piston member for actuating it at a speed below the overspeed, a valve in the conduit, a bearing for the shaft, means for maintaining a circulation of lubricating fluid through the bearing, and means movable in response to a predetermined temperature of the lubricating fluid after passing through the bearing for operating the valve.

7. The combination with an elastic fluid turbine having a shaft and associated therewith an auto stop governor embodying a piston member carried by the shaft and adapted to be actuated upon a definite overspeed thereof, of a conduit for conveying fluid under pressure to the piston member for actuating it at a speed below the overspeed, a valve in the conduit, a bearing for the shaft, means for maintaining a circulation of lubricating fluid through the bearing, a flexed bi-metallic member comprised of metals having different coefficients of expansion within the desired range of temperature of the bearing interposed in the path of lubricating fluid after it passes through the bearing, and an operative connection between the bi-metallic member and the valve.

8. The combination with an elastic fluid turbine having a shaft associated therewith and an auto stop governor embodying a piston member carried by the shaft and adapted to be actuated upon a definite overspeed thereof, of a conduit for conveying fluid under pressure to the piston member for actuating it at a speed below the overspeed, a valve in the conduit, bearings for the shaft, means for maintaining a circulation of lubricating fluid through each of the bearings, flexed bi-metallic members for each of the bearings comprised of metals having different coefficients of expansion within the desired range of temperature of the bearing interposed in the path of lubricating fluid after it passes through the bearing, a stem for operating the valve, and an operative connection between each of the bi-metallic members and the stem, whereby upon operation of either of the bi-metallic members responsive to an increase in temperature of the lubricating fluid the valve is operated.

In testimony whereof, I have hereunto subscribed my name this 17th day of April, 1925.

DAVID C. DAVIS.